(No Model.)
J. L. FINN.
OIL TANK PROTECTOR.
No. 290,558. Patented Dec. 18, 1883.
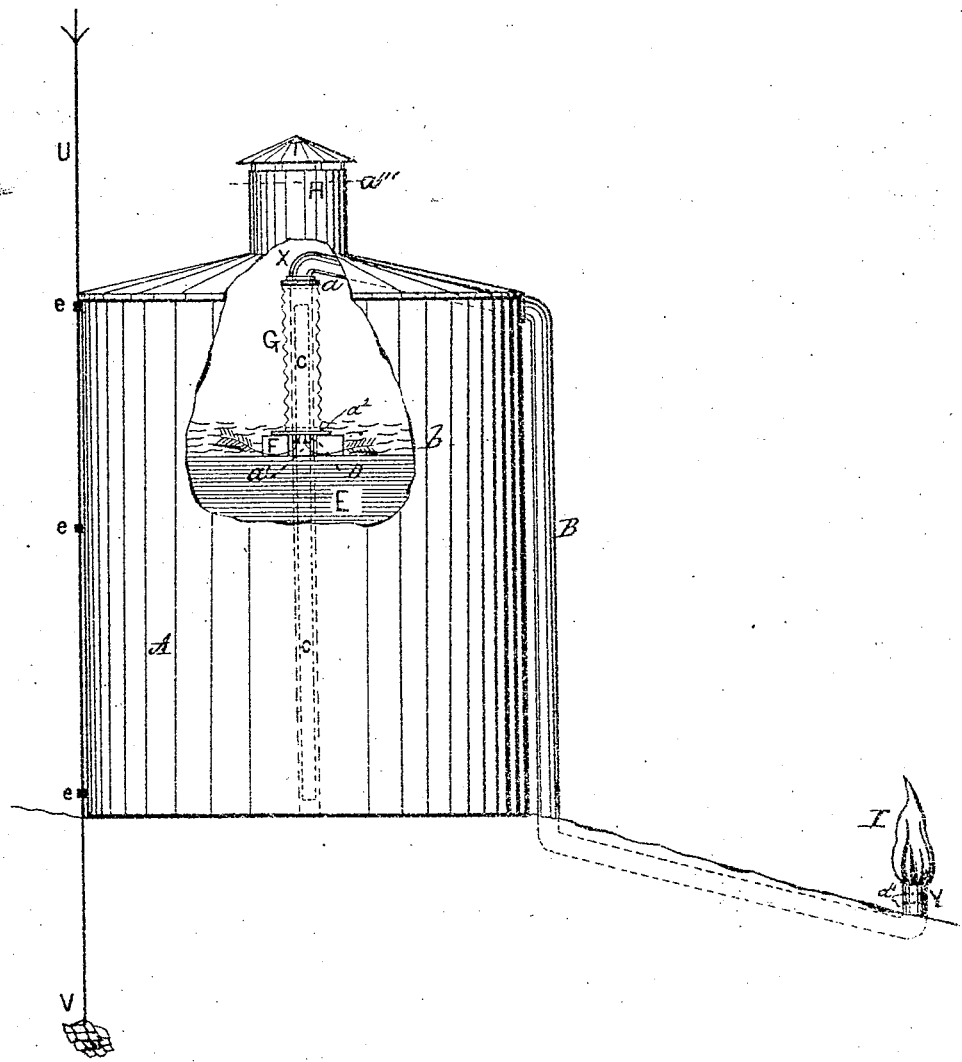
WITNESSES
INVENTOR

UNITED STATES PATENT OFFICE.

JOHN L. FINN, OF ELYRIA, ASSIGNOR OF ONE-HALF TO JAMES F. RYDER, OF CLEVELAND, OHIO.

OIL-TANK PROTECTOR.

SPECIFICATION forming part of Letters Patent No. 290,558, dated December 18, 1883.

Application filed July 9, 1883. (No model.)

*To all whom it may concern:*

Be it known that I, JOHN L. FINN, of Elyria, in the county of Lorain and State of Ohio, have invented a certain new and Improved Oil-Tank Protector; and I do hereby declare that the following is a full, clear, and complete description thereof.

It is well known that the explosion of oil-tanks is due, to a great extent, to the accumulations and retention of gas or vapor in the tank above the oil therein, and to the presence of gas floating and lingering about the outside of the tank from which it escapes. In the event the escaping gas becomes ignited, it communicates at once its heat and flame to the gas within the tank, and a consequent explosion takes place therein.

To guard against such accidents is the object of the above-mentioned invention, and which is effected by a continuous eduction of gas from the inside of the tank by means of a siphon-pipe, and thereby conducted a distance away from the tank and disposed of by burning or other means at the outlet of said siphon-pipe.

The following is a detailed description of the construction and operation of the above-specified invention, and for illustrating the same reference will be had to the annexed drawing, making a part of this specification, the figure being an elevation of the tank partially broken away.

As shown in the drawing, A represents an oil-tank, which may be of any holding capacity, and of the usual material.

B is a pipe entering the side of the tank near the top above the highest oil-line therein. Said pipe terminates in the tank at X, and extends therefrom to the outside, thence to the ground, in which it may be laid and extended to the point Y, which may be more or less distant from the tank.

To the end of the pipe B in the tank is connected a pipe, C, which extends down into the tank and terminates therein near the bottom. Said pipe C may be considered as a continuation of the pipe B, or a leg of the siphon-pipe.

G is a flexible sheath or sleeve inclosing the extension-pipe C, above alluded to. The upper end of the flexible sleeve is made fast to the collar $a$, so as to form an air-tight joint, and the sleeve descends therefrom to a float, F, to which it is secured, as above, and through which the pipe C freely passes, so that the float may move upward and downward thereon, as and for the purpose presently shown.

In the side of the float, above the oil E, are one or more openings, $a'$, and in the pipe C is a longitudinal slot, D, or a series of perforations. These openings place the space above the oil in communication or operation with the interior of said pipe, to allow the gas or vapor to escape from the tank through the openings $a'$ and D in the float and in the pipe C.

The practical operation of the above-described device is as follows: As seen in the drawing, $b$ represents the surface of the oil in the tank, upon which the float F rests. A portion of the tank is broken away, that it may be seen. The gas, being constantly eliminated from the oil, passes from the space above the oil into the pipe C, through the opening $a$, as indicated by the arrows. The flexible sleeve, being made gas-tight in its connection at $a$ with the pipe B, and at $a'$ with the float, prevents the gas in the space above the oil from entering the pipe C above its connection with the float, thereby establishing a siphon communication between the outside end, Y, of the pipe and the gas-space above the oil, thereby causing a current of gas or vapor to flow therefrom through pipe C. Thus, when the heavy vapor eliminated from the body of oil in the tank has filled the space in the tank above the oil up to the elbow X of the siphon, it will also have filled the pipe C to the same height. The vapor will then descend or gravitate along the siphon from the elbow to the outlet Y, while the lighter vapor will continue to ascend in the tank and escape therefrom through the opening in the top, and by its lightness become dissipated in the air. If the heavy vapor accumulates in the space above the oil, so as to fill the siphon-pipe, the pipe will then act on the volume of vapor in the tank by the same law that it would if acting on a fluid—that is to say, the pipe will then act as a siphon, and draw off all the heavy vapor down to the surface of the oil, discharging it at the outlet Y. The lighter gas, if any there be, will then be admitted into the pipe along with the heavy vapor, and by its presence arrest the action of the siphon, as air does, under like conditions, when a siphon is acting on a fluid.

It will be obvious that the action of the siphon is intermittent and automatic. When the vapor is all drawn off down to the inlet $a'$, its action ceases, and does not again take place until the heavy vapor has again filled the space and pipe. Then the siphonic action of the pipe is repeated, and so on, intermittently and automatically, as above specified. It will be obvious that this eduction of gas or vapor from the tank on a siphonic principle must discharge the gas from the tank as fast as it is produced therein; hence there can be no explosion of gas or vapor in the tank, it having been drawn from the tank by the siphon and disposed of. As the oil in the tank lowers by being drawn off, the float sinks down therein, and the flexible sleeve extends and covers the openings in the pipe C above the float as fast as the float sinks, so that the air cannot enter the pipe above the openings in the float F to arrest the working of the siphon from conducting the gas from the tank to the outside point Y. Again, on filling the tank with oil the float necessarily rises with the oil, and the sleeve, in consequence of its flexible nature, contracts or folds up as the float rises, thereby uncovering the slot or perforations in the pipe C, so that the gas may enter therein through the opening $a'$, as above mentioned.

U is a lightning-rod attached to the side of the tank, and in metallic connection therewith and not insulated, but terminating in the ground in the usual way, which will convey harmlessly to the ground all discharges it may receive of electricity from the clouds.

In the dome on top of tank is one or more perforated diaphragms, to arrest sparks and keep them from entering the tank in the event of the drifting embers from distant fires passing over or about the tank, (shown by the dotted line $a'''$.) The delivery end of the siphon-pipe at Y also has diaphragms $a^4$, to prevent fire from entering the pipe below the mouth, in the event that the gas is burned at the mouth.

The dome freely admits atmosphere to the inside of the tank, as this is necessary to the operation of the siphon, and at the same time relieves the tank from all gas-pressure, thereby very materially lessening the discharge of gas from the tank in the event that the tank should not be gas-tight throughout.

What I claim as my invention, and desire to secure by Letters Patent, is—

1. In oil-tanks for the purpose specified, the combination therewith of a siphon consisting of the pipes B and C, the pipe B extending down the outside of the tank and terminating remote therefrom, and the pipe C passing down into the tank, and provided with a longitudinal slot or slots, or with a series of perforations, with the float, and flexible sleeve inclosing the pipe C above the float, constructed and arranged to operate substantially in the manner as herein described.

2. In combination with an oil-tank, the dome H, having therein a perforated diaphragm, siphon, float, and flexible sleeve, constructed and arranged substantially in the manner as described, and for the purpose set forth.

In testimony whereof I affix my signature in presence of two witnesses.

JOHN L. FINN.

Witnesses:
J. H. BURRIDGE,
W. H. BURRIDGE.